United States Patent
Takeda et al.

(10) Patent No.: US 9,674,838 B2
(45) Date of Patent: Jun. 6, 2017

(54) USER TERMINAL, RADIO BASE STATION, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Yoshihisa Kishiyama, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/434,002

(22) PCT Filed: Sep. 10, 2013

(86) PCT No.: PCT/JP2013/074409
§ 371 (c)(1),
(2) Date: Apr. 7, 2015

(87) PCT Pub. No.: WO2014/057753
PCT Pub. Date: Apr. 17, 2014

(65) Prior Publication Data
US 2015/0282174 A1   Oct. 1, 2015

(30) Foreign Application Priority Data
Oct. 9, 2012   (JP) .................................. 2012-224475

(51) Int. Cl.
*H04W 72/04* (2009.01)
*H04W 72/12* (2009.01)
(Continued)

(52) U.S. Cl.
CPC ......... *H04W 72/0453* (2013.01); *H04L 5/001* (2013.01); *H04L 5/0053* (2013.01);
(Continued)

(58) Field of Classification Search
CPC ....................................................... H04L 5/001
See application file for complete search history.

(56) References Cited

U.S. PATENT DOCUMENTS 8,498,649 B2 * 7/2013 Seo ........................ H04L 5/0007
370/319
8,526,374 B2 * 9/2013 Damnjanovic ....... H04L 5/0053
370/329
(Continued)

FOREIGN PATENT DOCUMENTS

KR   20110081092 A   7/2011

OTHER PUBLICATIONS

International Search Report for corresponding International Application No. PCT/JP2013/074409, mailed Oct. 15, 2013 (1 page).
(Continued)

*Primary Examiner* — Andrew Lai
*Assistant Examiner* — Andrew C Lee
(74) *Attorney, Agent, or Firm* — Osha Liang LLP

(57) ABSTRACT

The present invention is designed to enable 1-CC transmission when carrier aggregation is carried out by aggregating a first component carrier, which is used in a macro cell, and a second component carrier, which is used in a small cell. A user terminal according to the present invention receives duration configuration information, which indicates a first duration to communicate with a macro base station by using the first component carrier, and a second duration to communicate with a small base station by using the second component carrier, configures the first duration and the second duration based on the duration configuration information, transmits uplink signals for the macro base station by using the first component carrier in the first duration, and transmits uplink signals for the small base station by using the second component carrier in the second duration.

11 Claims, 13 Drawing Sheets

(51) Int. Cl.
    H04L 5/00       (2006.01)
    H04L 5/14       (2006.01)
    H04W 76/02      (2009.01)
    H04W 84/04      (2009.01)
    H04W 16/32      (2009.01)
    H04W 88/02      (2009.01)
    H04W 88/08      (2009.01)

(52) U.S. Cl.
    CPC .............. *H04L 5/14* (2013.01); *H04L 5/1469* (2013.01); *H04W 72/0426* (2013.01); *H04W 72/1268* (2013.01); *H04W 76/025* (2013.01); *H04W 16/32* (2013.01); *H04W 84/045* (2013.01); *H04W 88/02* (2013.01); *H04W 88/08* (2013.01)

(56) References Cited

U.S. PATENT DOCUMENTS

| | | | | |
|---|---|---|---|---|
| 8,548,513 | B2* | 10/2013 | Yoon | H04L 5/0007 370/230 |
| 8,588,834 | B2* | 11/2013 | Lee | H04L 5/0007 370/329 |
| 8,619,654 | B2* | 12/2013 | Yang | H04W 52/0277 370/311 |
| 8,737,348 | B2* | 5/2014 | Oh | H04L 5/0058 370/252 |
| 8,953,532 | B2* | 2/2015 | Liu | H04W 72/0413 370/329 |
| 8,953,539 | B2* | 2/2015 | Jung | H04W 72/0406 370/328 |
| 8,971,286 | B2* | 3/2015 | Kishiyama | H04J 11/0069 370/330 |
| 9,107,084 | B2* | 8/2015 | Siomina | H04W 24/00 |
| 9,137,804 | B2* | 9/2015 | Lin | H04W 72/048 |
| 2002/0105935 | A1* | 8/2002 | Miya | H04B 7/26 370/342 |
| 2010/0056160 | A1* | 3/2010 | Kim | H04W 36/0055 455/444 |
| 2010/0279703 | A1* | 11/2010 | Morita | H04W 52/12 455/452.2 |
| 2010/0303035 | A1* | 12/2010 | Gao | H04L 5/0007 370/329 |
| 2010/0322118 | A1* | 12/2010 | Fang | H04W 36/08 370/280 |
| 2011/0044259 | A1* | 2/2011 | Nimbalker | H04L 5/001 370/329 |
| 2011/0103330 | A1* | 5/2011 | Montojo | H04W 72/0493 370/329 |
| 2011/0275361 | A1* | 11/2011 | Yavuz | H04W 52/143 455/422.1 |
| 2011/0317552 | A1* | 12/2011 | Lee | H04L 27/2601 370/228 |
| 2012/0003981 | A1* | 1/2012 | Krishnamurthy | H04W 24/10 455/450 |
| 2012/0076039 | A1* | 3/2012 | Kwon | H04B 7/0634 370/252 |
| 2012/0106404 | A1* | 5/2012 | Damnjanovic | H04L 5/001 370/279 |
| 2012/0122448 | A1* | 5/2012 | Mueck | H04W 28/24 455/424 |
| 2012/0142334 | A1* | 6/2012 | Sato | H04W 52/244 455/422.1 |
| 2012/0188884 | A1* | 7/2012 | Simonsson | H04W 36/0083 370/252 |
| 2012/0218954 | A1* | 8/2012 | Barbieri | H04L 5/003 370/329 |
| 2012/0263128 | A1* | 10/2012 | Hu | H04L 5/001 370/329 |
| 2012/0276916 | A1* | 11/2012 | Kazmi | G01S 5/0205 455/452.1 |
| 2012/0287828 | A1* | 11/2012 | Chen | H04L 1/1614 370/280 |
| 2013/0028149 | A1* | 1/2013 | Chen | H04L 5/0005 370/280 |
| 2013/0077551 | A1* | 3/2013 | Lo | H04W 16/14 370/312 |
| 2013/0155898 | A1* | 6/2013 | Yin | H04L 1/0026 370/254 |
| 2013/0337821 | A1* | 12/2013 | Clegg | H04L 5/0062 455/452.1 |
| 2014/0003356 | A1* | 1/2014 | Wang | H04W 72/1289 370/329 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
A. Benjebbour et al.; "Conceptual Views and Radio Access Technologies for Future Evolution of LTE-A;" IEICE Technical Report; RCS2012-100; (Aug. 2012); pp. 25-30 (8 pages).
NTT DOCOMO; "Discussion on 1CC transmission in a TTI for uplink inter-band carrier aggregation;" 3GPP TSG RAN WG4 Meeting #62bis, R4-121559; Jeju, Koria; Mar. 26-30, 2012 (4 pages).
CMCC; "Discussion of the possibility of using subframe offset for interference avoidance in TDD systems"; 3GPP TSG-RAN WG1 #62bis, R1-105272; Xi'an, China; Oct. 11-15, 2010 (6 pages).
Extended European Search Report issued in corresponding European Application No. 13845218.0, mailed on May 31, 2016 (9 pages).
Office Action issued in corresponding Japanese Application No. 2012-224475, mailed Nov. 15, 2016 (10 pages).
Office Action issued in corresponding European Application No. 13845218.0, mailed Feb. 1, 2017 (5 pages).

* cited by examiner

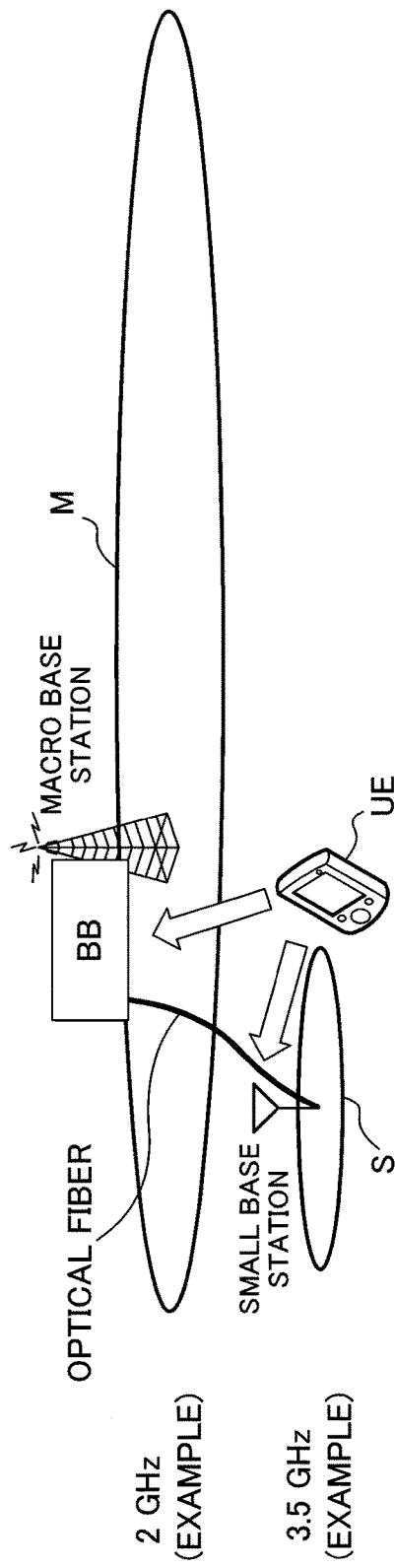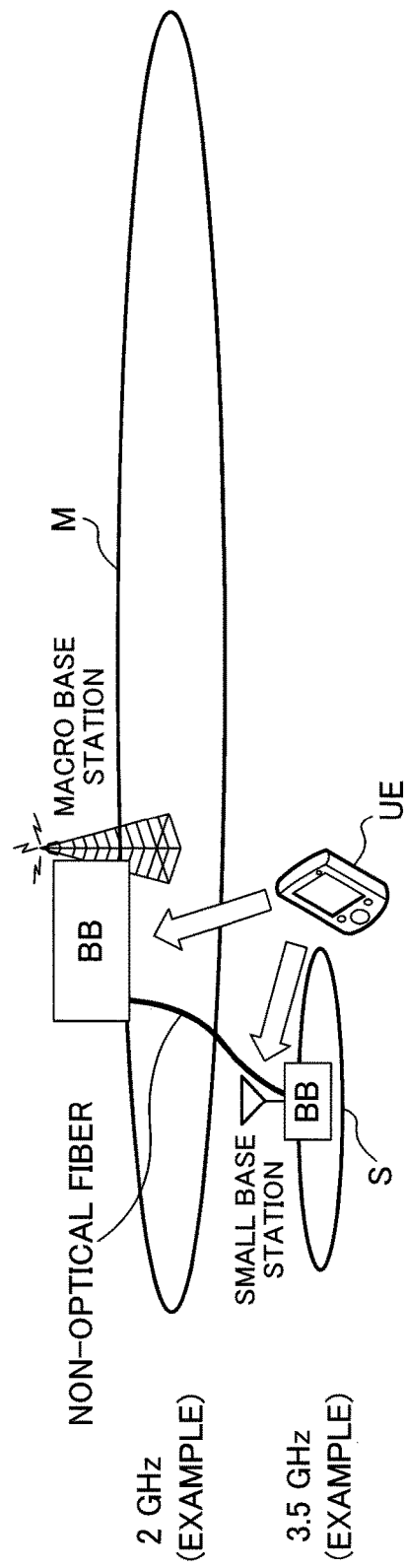

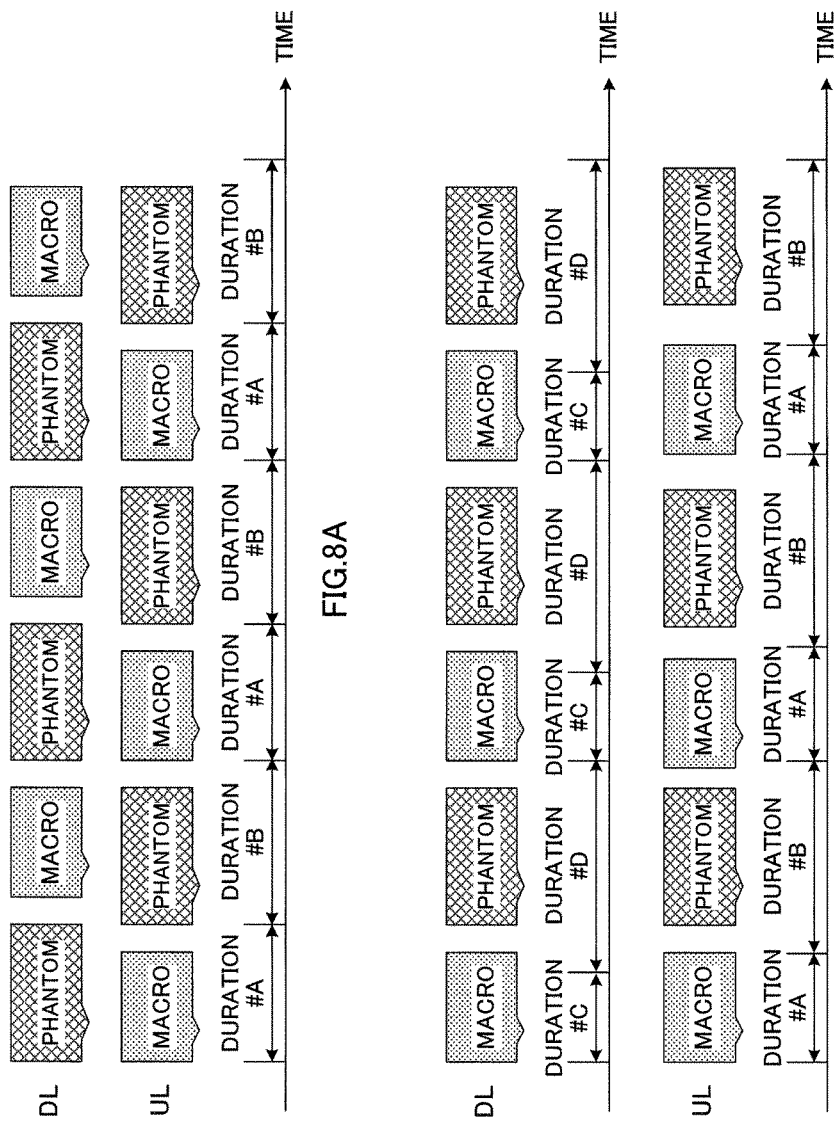

USER TERMINAL, RADIO BASE STATION, RADIO COMMUNICATION SYSTEM AND RADIO COMMUNICATION METHOD

TECHNICAL FIELD

The present invention relates to a user terminal, a radio base station, a radio communication system and a radio communication method in a next-generation mobile communication system where a macro cell and a small cell are arranged to overlap at least in part.

BACKGROUND ART

In a UMTS (Universal Mobile Telecommunications System) network, long-term evolution (LTE) is under study for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE (referred to as, for example, "LTE-advanced" or "LTE enhancement" (hereinafter referred to as "LTE-A")) are under study for the purpose of achieving further broadbandization and increased speed beyond LTE. In an LTE-A system, a HetNet (Heterogeneous Network), in which a small cell (for example, a pico cell, a femto cell and so on) having a local coverage area of a radius of approximately several tens of meters is formed in a macro cell having a wide coverage area of a radius of approximately several kilometers, is under study (for example, non-patent literature 1).

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

A study is in progress to carry out carrier aggregation, which aggregates a plurality of component carriers to achieve broadbandization, in the above HetNet. For example, in the HetNet, it may be possible to carry out carrier aggregation by aggregating a first component carrier used in the macro cell and a second component carrier used in the small cell. As for the method of transmitting signals in this HetNet, 2-CC simultaneous transmission and 1-CC transmission are possible.

In 2-CC simultaneous transmission, signals are transmitted using first and second component carriers simultaneously in predetermined time units (for example, in TTI (Transmission Time Interval) units). In 1-CC transmission, the component carrier to use is switched in predetermined time units (for example, in TTI units), so that, if focus is placed on a predetermined time unit, signals are transmitted using only one component carrier.

In 2-CC simultaneous transmission, the complication of RF (Radio Frequency) circuits in the transmitter becomes a problem. In particular, in uplink 2-CC simultaneous transmission, the RF circuits of the user terminal become complicated, and this is not desirable. Consequently, it is preferable to employ 1-CC transmission when carrier aggregation is carried out by aggregating the first component carrier that is used in the macro cell and the second component carrier that is used in the small cell.

The present invention has been made in view of the above, and it is therefore an object of the present invention to provide a user terminal, a radio base station, a radio communication system and a radio communication method that are suitable for 1-CC transmission that is employed when carrier aggregation is carried out by aggregating a first component carrier, which is used in a macro cell, and a second component carrier, which is used in a small cell.

Solution to Problem

The user terminal of the present invention is a user terminal in a radio communication system where carrier aggregation is carried out by aggregating a first component carrier, which is used in a macro cell, and a second component carrier, which is used in a small cell, and this user terminal has a receiving section that receives duration configuration information, which indicates a first duration to communicate with a macro base station forming the macro cell by using the first component carrier, and a second duration to communicate with a small base station forming the small cell by using the second component carrier, a configuration section that configures the first duration and the second duration based on the duration configuration information, and a transmitting section that, in the first duration, transmits an uplink signal for the macro base station by using the first component carrier, and that, in the second duration, transmits an uplink signal for the small base station by using the second component carrier.

Technical Advantages of the Invention

According to the present invention, it is possible to provide a user terminal, a radio base station, a radio communication system and a radio communication method that are suitable for 1-CC transmission that is employed when carrier aggregation is carried out by aggregating a first component carrier, which is used in a macro cell, and a second component carrier, which is used in a small cell.

BRIEF DESCRIPTION OF THE DRAWINGS

FIG. 2 provides diagram to explain HetNet structures;

FIG. 8 provides diagrams to explain a 1-CC transmission method according to a sixth example of the present invention;

DESCRIPTION OF EMBODIMENTS

FIG. 1 provides conceptual diagrams of carrier aggregation in a HetNet. As shown in FIG. 1, in a HetNet, carrier aggregation is carried out by aggregating a first component carrier (CC 1), which is used in a macro cell, and a second component carrier (CC 2), which is used in a small cell.

As for the method of transmitting signals in this HetNet, 2-CC simultaneous transmission and 1-CC transmission may be possible. As shown in FIG. 1A, when 2-CC simultaneous transmission is used on the uplink, uplink signals (for example, an uplink data channel (PUSCH: Physical Uplink Shared Channel)) are transmitted using both the first component carrier and the second component carrier in predetermined time units (for example, in TTI units).

Figure 1B:
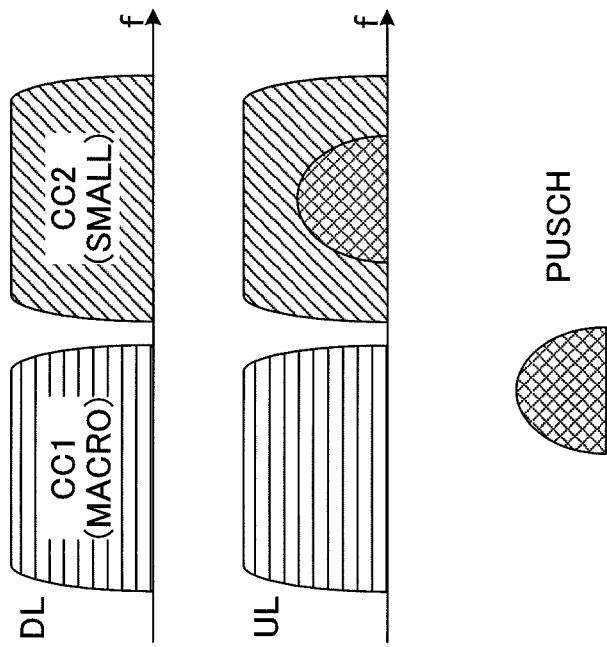
FIG. 1 provides conceptual diagrams of carrier aggregation in a HetNet.
Figure 1A:
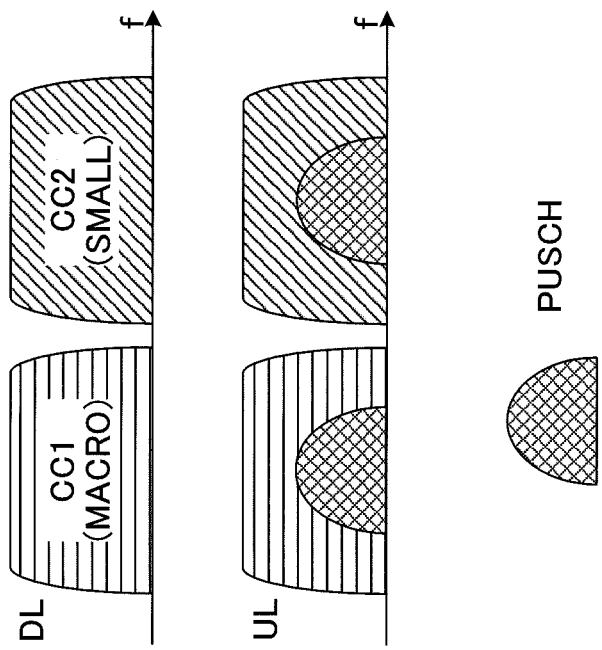

When 1-CC simultaneous transmission is used on the uplink as shown in FIG. 1B, uplink signals (for example, the PUSCH) are transmitted using one of the first component carrier and the second component carrier in predetermined time units (for example, in TTI units). In this way, in 1-CC transmission, the component carrier to use is switched in predetermined time units. 1-CC transmission makes it possible to avoid the complication of RF circuits in the transmitter, and therefore, in the future, 1-CC transmission is expected to gain greater importance.

FIG. 2 provides diagrams to explain HetNet structures in which the above 1-CC transmission (FIG. 1B) is used. As shown in FIG. 2, a HetNet refers to a radio communication system in which a macro cell M and a small cell S are arranged to physically overlap at least in part. A HetNet is configured by including a radio base station that forms the macro cell M (hereinafter referred to as the "macro base station"), a radio base station that forms the small cell S (hereinafter referred to as the "small base station"), and a user terminal UE that communicates with the macro base station and the small base station.

To be more specific, as HetNet structures where the above-described 1-CC transmission is used, a first structure to provide a scheduling section (BB (baseband) processing section) in the macro base station alone as shown in FIG. 2A, and a second structure to provide a scheduling section (BB (baseband) processing section) in both the macro base station and the small base station as shown in FIG. 2B, are possible. The carrier aggregation illustrated in FIG. 2A may be referred to as "intra-base station carrier aggregation" (intra-eNB CA). The carrier aggregation illustrated in FIG. 2B may be referred to as "inter-base station carrier aggregation" (inter-eNB CA).

In the first structure shown in FIG. 2A, the macro base station and the small base station are connected via optical fiber, and the scheduling section in the macro base station controls the allocation of radio resources in the macro cell M and the small cell S. For example, when the 1-CC transmission illustrated in FIG. 1B is carried out in the first structure, the scheduling section of the macro base station switches the component carrier to use between the first and second component carriers, in predetermined time units (for example, in TTI units).

In the second structure illustrated in FIG. 2B, the macro base station and the small base station are connected via a non-optical fiber link such as an X2 interface, a backhaul link and/or the like (which may be wired or wireless). In the second structure, the scheduling sections of the macro base station and the small base station control the allocation of radio resources in their own cells separately.

For example, when the 1-CC transmission illustrated in FIG. 1B is carried out in the second structure, the scheduling section of the macro base station cannot, at its own discretion, switch the component carrier to use, unlike the first configuration. This is because the scheduling section is provided in the small base station as well. When the scheduling sections of the macro base station and the small base station are both coordinated for 1-CC transmission, there is a threat that 1-CC transmission cannot be carried out in a simple fashion due to the complex coordinated control between the macro base station and the small base station.

So, assuming a radio communication system in which carrier aggregation is carried out by aggregating a first component carrier that is used in a macro cell M and a second component carrier that is used in a small cell S, the present inventors have come up with the idea of making the coordinated control between the macro base station and the small base station unnecessary by configuring the duration to use the first component carrier or the second component carrier in advance, and thereupon arrived at the present invention.

With the 1-CC transmission method according to the present invention, a user terminal UE receives duration configuration information, which indicates a first duration to communicate with a macro base station by using a first component carrier and a second duration to communicate with a small base station is carried out by using a second component carrier. The user terminal UE configures the above first duration and second duration based on the duration configuration information. The user terminal UE transmits uplink signals for the macro base station using the first component carrier in the first duration, and transmits uplink signals for the small base station using the second component carrier in the second duration.

By this means, the first duration to use the first component carrier and the second duration to use the second component carrier can be configured in advance, so that it is possible to implement 1-CC transmission in a simple fashion. In particular, in the radio communication system of the second structure illustrated in FIG. 2B, it is not necessary to execute complex coordinated control between the macro base station and the small base station, so that it is possible to carry out 1-CC transmission in a simple fashion.

Here, the first component carrier is a frequency block that is used in the macro cell M and has a relatively low frequency band (for example, 2 GHz and so on). The second component carrier is a frequency block that is used in the small cell S and has a relatively high frequency band (for example, 3.5 GHz and so on). The first and second component carriers each have, for example, a bandwidth of 20 MHz.

In this way, the 1-CC transmission method of the present invention presumes, when the first component carrier to be used in the macro cell M and the second component carrier to be used in the small cell S are different frequency bands, aggregating the first and second component carriers (which may be referred to as "CA scenario 4," and note that FIG. 2A illustrates a case of intra-eNB CA while FIG. 2B illustrates a case of inter-eNB CA). Note that the number of component carriers to be aggregated in this carrier aggregation is not limited to two component carriers, and three or more component carriers used in the macro cell M and a plurality of small cells S may be aggregated as well.

The 1-CC transmission method of the present invention is intended for use in the HetNet of the second structure illustrated in FIG. 2B. In the HetNet of the second structure, the macro cell-assisted access scheme may be employed between the macro cell M and the small cell S. In the macro cell-assisted access scheme, C-plane signal s (control signals) are transmitted and received in the macro cell M, and U-plane signals (data signals) are transmitted and received in the small cell S.

In the macro cell M, a carrier wave (also referred to as "conventional carrier," "coverage carrier," and so on) of a relatively low frequency band (for example, 2 GHz) is used. Consequently, it is possible to maintain the connectivity and mobility of the user terminal UE by transmitting control signals using the carrier wave of the macro cell M. In the small cell S, a carrier wave (also referred to as "additional carrier," "capacity carrier," and so on) of a relatively high frequency band (for example, 3.5 GHz) is used. Consequently, it is possible to achieve high throughput by transmitting data signals using the carrier wave of the small cell S.

Note that, in the small cell S of the macro cell-assisted access scheme, a new carrier type, in which the region to place a downlink control channel (PDCCH: Physical Downlink Control Channel), which is maximum three OFDM symbols from the top of a subframe, and cell-specific reference signals (CRSs) are removed or are inserted at a lower density, is used. A small cell S to use this new carrier type may be referred to as a "phantom cell."

Assume that, hereinafter, the macro cell-assisted access scheme is employed in the HetNet of the second structure shown in FIG. 2B. However, the 1-CC transmission method of the present invention is by no means limited to the macro cell-assisted access scheme, and is also applicable to cases where control signals and data signals are transmitted and received in both of the macro cell M and the small cell S. That is to say, the 1-CC transmission method of the present invention may be applied to the case of intra-base station carrier aggregation illustrated in FIG. 2A as well.

First Example

Figure 3:
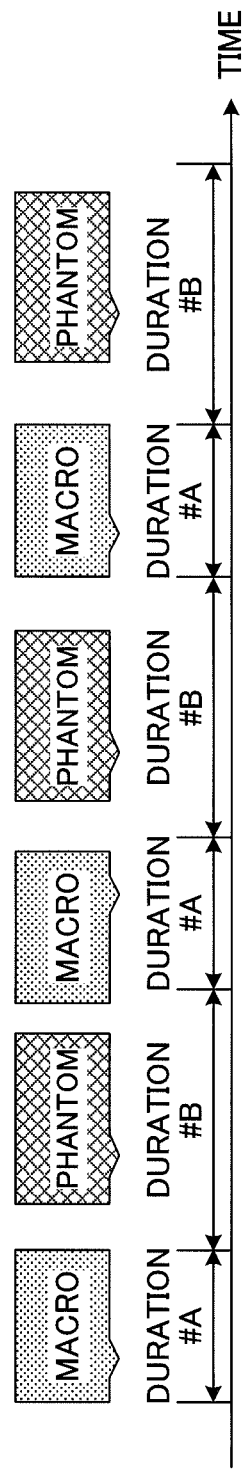
FIG. 3 is a diagram to explain a 1-CC transmission method according to a first example of the present invention.

Now, the 1-CC transmission method according to a first example of the present invention will be described with reference to FIG. 3. FIG. 3 is a diagram to explain the 1-CC transmission method according to the first example. In FIG. 3, duration #A is the first duration to communicate with the macro base station (macro) by using the first component carrier. Duration #B is the second duration to communicate with the small base station (phantom) by using the second component carrier.

The user terminal UE receives duration configuration information that indicates duration #A and duration #B. When, for example, carrier aggregation of the first and second component carriers is configured, the duration configuration information is reported to the user terminal UE by using higher layer signaling such as RRC (Radio Resource Control). Note that the duration configuration information may be reported from either the macro base station or the small base station.

Here, the duration configuration information may be the index numbers that are attached to the predetermined time units (for example, subframe and radio frames) that respectively constitute duration #A and duration #B. For example, when duration #A and duration #B are formed with at least one subframe (1 ms), the duration configuration information may be the index numbers of the subframes. If duration #A and duration #B are formed with at least one radio frame (10 ms), the duration configuration information may be the system frame numbers (SFNs).

The duration configuration information may be the cycles of duration #A and duration #B. Note that the cycle of duration #A equals the time interval between the time duration #A started last time and the time duration #A starts next time. The same holds with the cycle of duration #B.

The duration configuration information may show duration #A and duration #B in bitmap format by using predetermined time units (for example, subframes, radio frames and so on) as the smallest unit. For example, when subframes are the smallest unit, it is possible to associate each bit of the bitmap with the subframes, and indicate the subframes corresponding to duration #A with "0" and the subframes corresponding to duration #B with "1." In this case, if duration #A is formed with subframes #0 and #1 and duration #B is formed with subframes #2 to #9, the duration configuration information becomes the bit information "0011111111."

Based on duration configuration information such as that described above, the user terminal UE configures duration #A and duration #B. Note that, in the macro cell-assisted access scheme, control signals, which carry a low amount of information, are transmitted and received in the macro cell M, and data signals, which carry a large amount of information, are transmitted and received in the small cell S. Consequently, the user terminal UE may configure duration #B longer than duration #A based on duration configuration information.

The user terminal UE transmits uplink signals for the macro base station using the first component carrier in duration #A configured, and transmits uplink signals for the small base station using the second component carrier in duration #B configured. By this means, 1-CC transmission on the uplink is made possible.

The user terminal UE may receive downlink signals from the macro base station by using the first component carrier in duration #A configured, and receive downlink signals from the small base station by using the second component carrier in duration #B configured. By this means, 1-CC transmission is made possible in both the uplink and the downlink. In this case, it is possible to implement a phantom cell by providing only one RF circuit in the user terminal UE.

In this way, with the 1-CC transmission method according to the first example, duration #A to use the first component carrier and duration #B to use the second component carrier are configured in advance based on duration configuration information. Consequently, in the radio communication system of the second structure illustrated in FIG. 2B, it is not necessary to execute complex coordinated control between the macro base station and the small base station, so that it is possible to carry out 1-CC transmission in a simple fashion.

Second Example

The 1-CC transmission method according to a second example of the present invention will be described with reference to FIG. 4. With the 1-CC transmission method according to the second example, the user terminal UE receives duration change information for changing the lengths of duration #A and duration #B, and changes the lengths of duration #A and duration #B based on the duration change information.

Figure 4:
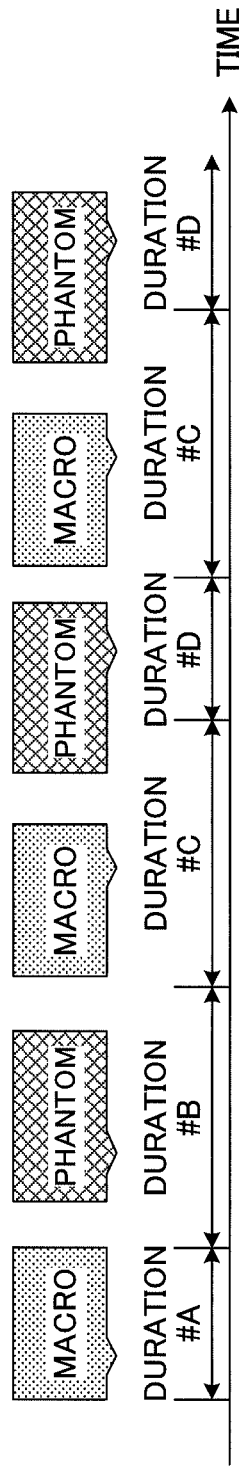
FIG. 4 is a diagram to explain a 1-CC transmission method according to a second example of the present invention.

FIG. 4 is a diagram to explain the 1-CC transmission method according to the second example. Now, differences from the 1-CC transmission method according to the first example will be primarily described below.

In the event of the macro cell-assisted access scheme, usually, the amount of information which the user terminal UE transmits and receives is greater in the small cell S than in the macro cell M. Consequently, duration #B to communicate with small base station (phantom) is configured to be longer than duration #A to communicate with the macro base station (macro). When control signals such as the SRB (Signaling Radio Bearer) need to be transmitted and received with the macro base station, it is preferable to make the duration to communicate with the macro base station (macro) longer. So, as shown in FIG. 4, it is desirable to make duration #A and duration #B (duration #A<duration #B) switchable to duration #C and duration #D (duration #C>duration #D), respectively.

In FIG. 4, the user terminal UE receives duration change information for changing the lengths of duration #A and duration #B. Here, the duration change information is information for switching duration #A and duration #B (duration #A<duration #B) to duration #C and duration #D (duration #C>duration #D), respectively, but is by no means limited to this. The duration change information needs not hold the relationship of duration #C>duration #D as long as the lengths of duration #A and duration #B can be changed.

Here, for the duration change information, the index numbers assigned to the predetermined time units that respectively constitute duration #C and duration #D (for example, subframe index numbers, system frame numbers (SFNs) and so on) can be used.

The duration change information may be reported to the user terminal UE by using MAC (Media Access Control) signaling. MAC signaling is lower signaling than RRC signaling, and therefore can report duration change information in a more simple fashion. Note that the duration change information may be reported by higher layer signaling such as RRC signaling.

When duration change information is reported to the small base station, the duration change information may be reported from the macro base station to the small base station directly, or may be reported to the small base station via the user terminal UE. In the event of direct reporting, the macro base station reports the duration change information that is reported to the UE to the small base station as well, via a backhaul link. In the event of reporting via the user terminal UE, upon receiving duration change information from the macro base station, the user terminal UE transmits a positive acknowledgement (ACK) to the macro base station, and also transmits the duration change information to the small base station by using MAC signaling.

In this way, with the 1-CC transmission method according to the second example, it is possible to change the lengths of duration #A, in which the first component carrier is used, and duration #B, in which the second component carrier is used, based on duration change information. It is possible to carry out flexible 1-CC transmission taking into account the amount of information in the macro cell M and the small cell S.

Third Example

The 1-CC transmission method according to a third example of the present invention will be described with reference to FIG. 5. The 1-CC transmission method according to the third example presumes a case where one of the first component carrier and the second component carrier employs a time division duplexing (TDD) scheme, while the other one employs a frequency division duplexing (FDD) scheme. In this case, in downlink subframes of the component carrier where the TDD scheme is employed, the user terminal UE transmits uplink signals using the component carrier where the FDD scheme is employed.

Figure 5:
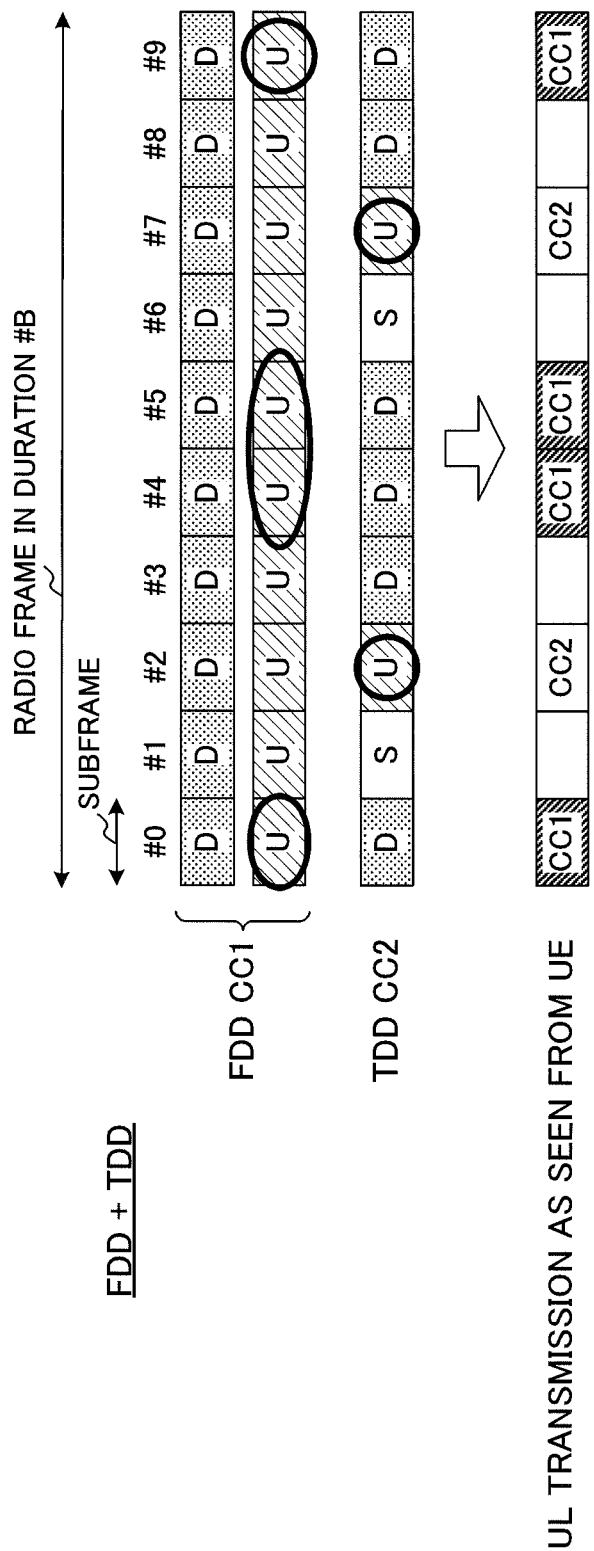
FIG. 5 is a diagram to explain a 1-CC transmission method according to a third example of the present invention.

FIG. 5 is a diagram to explain the 1-CC transmission method according to the third example. Note that the 1-CC transmission method according to the third example can combine the 1-CC transmission methods according to the first and second examples as appropriate. Now, differences from the 1-CC transmission methods according to the first and second examples will be primarily described below.

In FIG. 5, a case is assumed where the FDD scheme is applied to the first component carrier (CC 1) and the TDD scheme is applied to the second component carrier (CC 2)—that is, a case is assumed where the user terminal UE communicates with the macro base station in the FDD scheme and communicates with the small base station in the TDD scheme. Note that, by contrast with this, the 1-CC transmission method according to the second example can also be used in the case where the first component carrier employs the TDD scheme and the second component carrier employs the FDD scheme.

Assume that, in FIG. 5, the structures of radio frames (10 ms) included in duration #B of FIG. 3 is shown. Note that the radio frame structures shown in FIG. 5 are only examples and are by no means limiting. Duration #B may be formed with two or more radio frames.

As shown in FIG. 5, the FDD scheme is employed in the first component carrier (CC 1), so that a radio frame that is formed only with downlink subframes (D) and a radio frame that is formed only with uplink subframes (U) are provided.

The TDD scheme is employed in the second component carrier (CC 2), so that downlink subframes (D), uplink subframes (U) and special subframes (S) are provided in one radio frame. Note that a special subframe (S) is a subframe that is used in both the downlink/uplink.

When the TDD scheme is employed in the second component carrier (CC 2), the user terminal UE transmits uplink signals for the small base station in the uplink subframes (#2 and #7). In the downlink subframes (#0, #3-#5, #8 and #9), the user terminal UE does not transmit uplink signals. Consequently, the time uplink signals can be transmitted in duration #B is limited.

Here, in the downlink subframes (#0, #3-#5, #8 and #9) of the second component carrier, the RF transmitting circuit of the user terminal UE is not used. Since the FDD scheme is employed in the first component carrier, it is possible to transmit uplink signals using the first component carrier in the same times (subframes) as in the above downlink subframes (#0, #3-#5, #8 and #9).

So, the user terminal UE may transmit uplink signals for the macro base station using the first component carrier in the downlink subframes (#0, #4, #5 and #9) of the second component carrier.

Note that the downlink subframes (#3 and #8) and special subframes (#1 and #6) that neighbor the uplink subframes of the second component carrier are used as times to switch between the first and second component carriers in the RF transmitting circuit. These switching times last one subframe in FIG. 5, but may as well be more than one subframe.

In this way, with the 1-CC transmission method according to the third example, when the TDD scheme is employed in the second component carrier, in the downlink subframes of the second component carrier, uplink signals are transmitted by using the first component carrier. Consequently, it is possible to make effective use of the RF transmitting circuit that is not used in the user terminal UE, and increase the time uplink signals can be transmitted.

Fourth Example

The 1-CC transmission method according to a fourth example of the present invention will be described with reference to FIG. 6. The 1-CC transmission method according to the fourth example presumes a case where the time division duplexing (TDD) scheme is employed in both the first component carrier and the second component carrier. In this case, the user terminal UE receives shift information for shifting the uplink subframes of the first component carrier and/or the second component carrier. The user terminal UE transmits uplink signals in uplink subframes that are configured based on the shift information.

Figure 6:
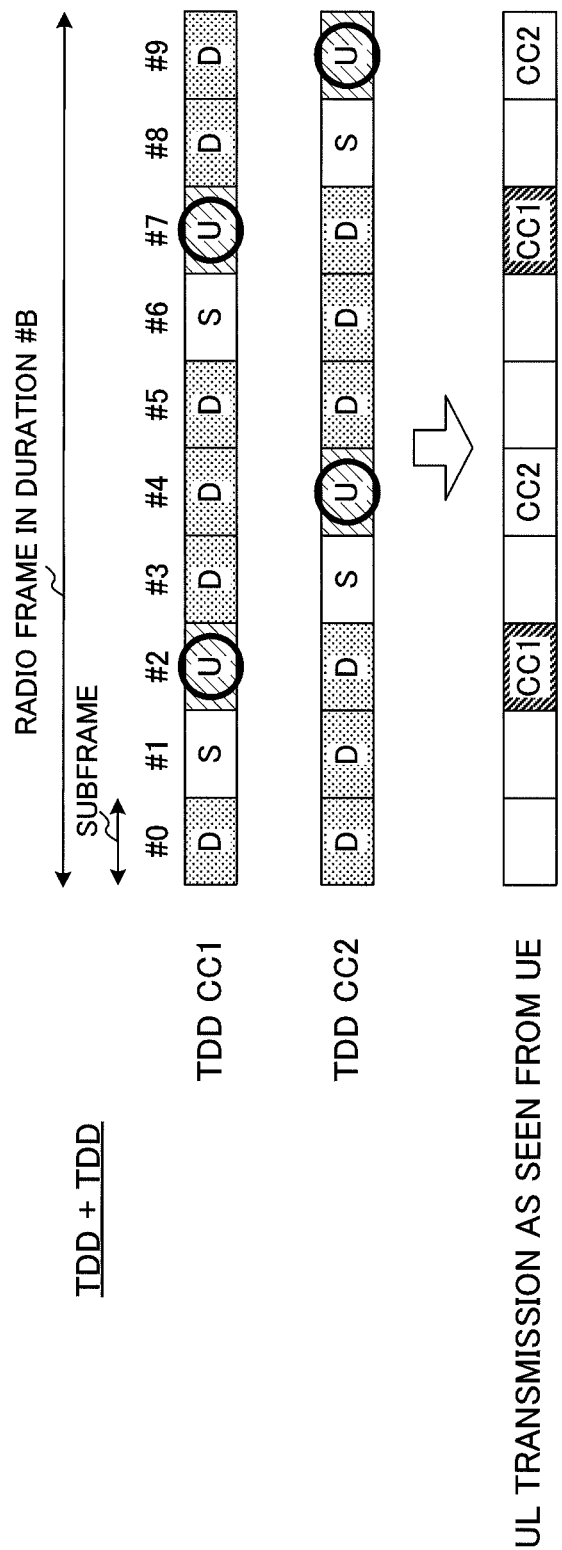
FIG. 6 is a diagram to explain a 1-CC transmission method according to a fourth example of the present invention.

FIG. 6 is a diagram to explain the 1-CC transmission method according to the fourth example. Note that the 1-CC transmission method according to the fourth example can combine the 1-CC transmission methods according to the first and second examples as appropriate. Now, differences from the 1-CC transmission methods according to the first and second examples will be primarily described below.

Note that, although FIG. 6 shows examples of radio frames in duration #B for the second component carrier, the same applies to the radio frames in duration #A for the first component carrier. Furthermore, the radio frame structures shown in FIG. 6 are only examples and are by no means limiting.

As shown in FIG. 6, when the TDD scheme is employed in both of the first and second component carriers (CC 1 and CC 2), downlink subframes (D), uplink subframes (U) and special subframes (S) are provided in one radio frame in both of the first and second component carriers. Note that, although FIG. 6 assumes, for example, employing TDD configuration 2, this is by no means limiting.

As has been described above with the third example, when, in duration #B, the user terminal UE transmits uplink signals using only the uplink subframes of the second component carrier, the time uplink signals can be transmitted is limited. Consequently, in duration #B for the second component carrier, the user terminal UE may transmit uplink signals using the uplink subframe of the first component carrier.

If, in this case, the uplink subframes of the first and second component carrier overlap, the uplink signals of only one of the first and the second component carriers can be transmitted. This is because there is only one RF transmitting circuit in the user terminal UE.

So, shift information for shifting the uplink subframes of the first component carrier and/or the second component carrier is reported to the user terminal UE. The user terminal UE transmits uplink signals in uplink subframes that are configured based on the shift information.

Here, the shift information refers to, for example, the amount of shift of uplink subframes, the subframe index numbers after shift, and so on. The shift information may be reported from either of the macro base station and the small base station to the user terminal UE. The shift information is reported by, for example, higher layer signaling such as RRC signaling.

For example, in FIG. 6, the user terminal UE shifts the uplink subframes of the second component carrier two subframes forward, based on the shift information. The user terminal UE transmits uplink signals for the small base station in the uplink subframes (#4 and #9) of the second component carrier, and transmits uplink signals for the macro base station in the uplink subframes (#2 and #7) of the first component carrier.

Note that the above-described shift information is preferably configured such that at least one subframe is provided between uplink subframes between both of the first and second component carriers. This is because time to switch between the first and second component carriers is required in the RF transmitting circuit of the user terminal UE.

In this way, with the 1-CC transmission method according to the fourth example, when the TDD scheme is employed in both of the first and second component carriers, it is possible to shift the positions of the uplink subframes of the first and second component carriers. Consequently, it is possible to make effective use of the RF transmitting circuit that is not used in the user terminal UE and increase the time uplink signals can be transmitted.

Fifth Example

The 1-CC transmission method according to a fifth example of the present invention will be described with reference to FIG. 7. The 1-CC transmission method according to the fifth example presumes a case where carrier aggregation is carried out by aggregating three or more component carriers, including the first component carrier and the second component carrier.

FIG. 7 provides diagrams to explain the 1-CC transmission method according to the fifth example. Note that the 1-CC transmission method according to the fifth example can be combined with the first to fourth examples as appropriate. Now, differences from the 1-CC transmission methods according to the first to fourth examples will be primarily described below.

Figure 7A:
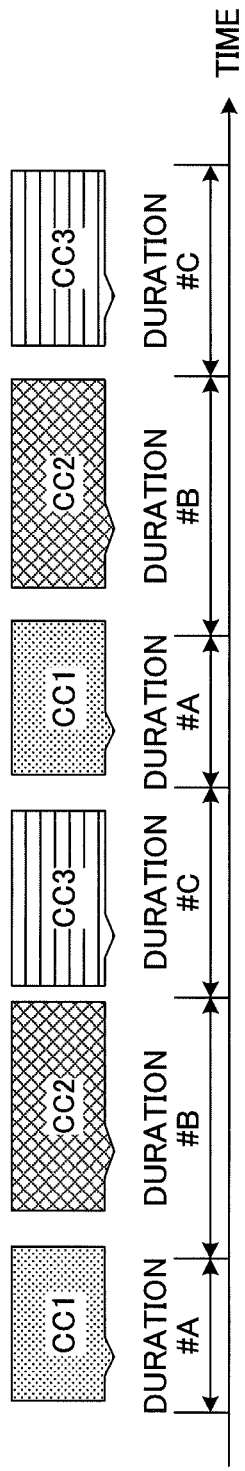
FIG. 7 provides diagrams to explain a 1-CC transmission method according to a fifth example of the present invention.
Figure 7B:
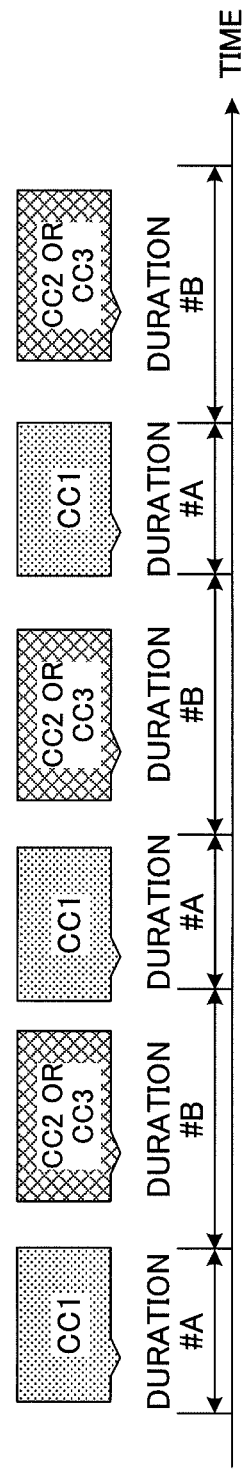

When carrier aggregation is carried out by aggregating three or more component carriers, a method of configuring separate durations on a per component carrier basis as shown in FIG. 7A, and a method of configuring a shared duration, which is to be shared by a plurality of component carriers, as shown in FIG. 7B may be possible. Although a case will be described below where carrier aggregation is carried out by aggregating three component carriers, it is equally possible to aggregate four more component carriers as well.

In FIG. 7A, separate durations #A, #B and #C, which are independent of each other, are provided for the first, second and third component carriers (CC 1, CC 2 and CC3), respectively. In this case, the user terminal UE receives duration configuration information, which indicates separate durations #A to #C respectively, and configures separate durations #A to #C based on this duration configuration information.

In each of durations #A to #C, the user terminal UE carries out communication using the matching component carrier. Note that communication using the third component carrier may be carried out with the macro base station that is the same as with the first component carrier, with the small base station that is the same as with the second component carrier, or with either a macro base station or a small base station that is different from these.

In FIG. 7B, shared duration #B, which is shared between the second and third component carriers (CC 2 and CC 3), is provided. In this case, the user terminal UE receives duration configuration information, which indicates separate duration #A for the first component carrier and shared duration #B that is shared between the second and third component carriers, and configures separate duration #A and shared duration #B based on this duration configuration information.

In FIG. 7B, the user terminal UE receives, in individual duration #A, component carrier information that indicates the component carrier to use in next shared duration #B. The component carrier information is reported by using, for example, MAC signaling. Note that, if the same component carrier as in previous shared duration #B is going to be used, the reporting of component carrier information may be omitted. The component carrier information may be reported from either of the macro base station and the small base station.

Sixth Example

The 1-CC transmission method according to a sixth example of the present invention will be described with reference to FIG. 8. With the 1-CC transmission method according to the sixth example, the structures of uplink/downlink durations will be described.

FIG. 8 provides diagrams to explain the 1-CC transmission method according to the sixth example. Note that the 1-CC transmission method according to the sixth example can be combined with the first to fifth examples as appropriate. Now, differences from the 1-CC transmission methods according to the first to fifth examples will be primarily described below.

As for the structures of uplink/downlink durations, there is a method of configuring common durations between the uplink and the downlink as shown in FIG. 8A, and a method of configuring different durations between the uplink and the downlink as shown in FIG. 8B.

Referring to FIG. 8A, in uplink duration #A, uplink signals for the macro base station (macro) are transmitted using the first component carrier, and, in duration #B, uplink signals for the small base station (phantom) are transmitted using the second component carrier. In downlink duration #A, downlink signals from the small base station (phantom) are received using the second component carrier, and, in duration #B, downlink signals from the macro base station (macro) are received using the first component carrier.

In this way, in FIG. 8A, although common durations are configured between the uplink and the downlink, in the same duration, communication is carried out using different cells (component carriers) between the uplink and the downlink. By this means, different frequency bands are used between the uplink and the downlink in the same duration, so that it is possible to prevent interference between the macro cell M and the small cell S.

In FIG. 8B, on the uplink, durations #A and #B are configured, while, on the downlink, duration #C and duration #D, which are different from duration #A and duration #B, are configured. In this way, in FIG. 8B, different durations are configured between the uplink and the downlink. By this means, it becomes possible to configure durations in a flexible fashion.

Now, the radio communication system according to the present embodiment will be described below in detail. In this radio communication system, the above-described 1-CC transmission methods according to the first to sixth examples are employed.

(Configuration of Radio Communication System)

Figure 9:
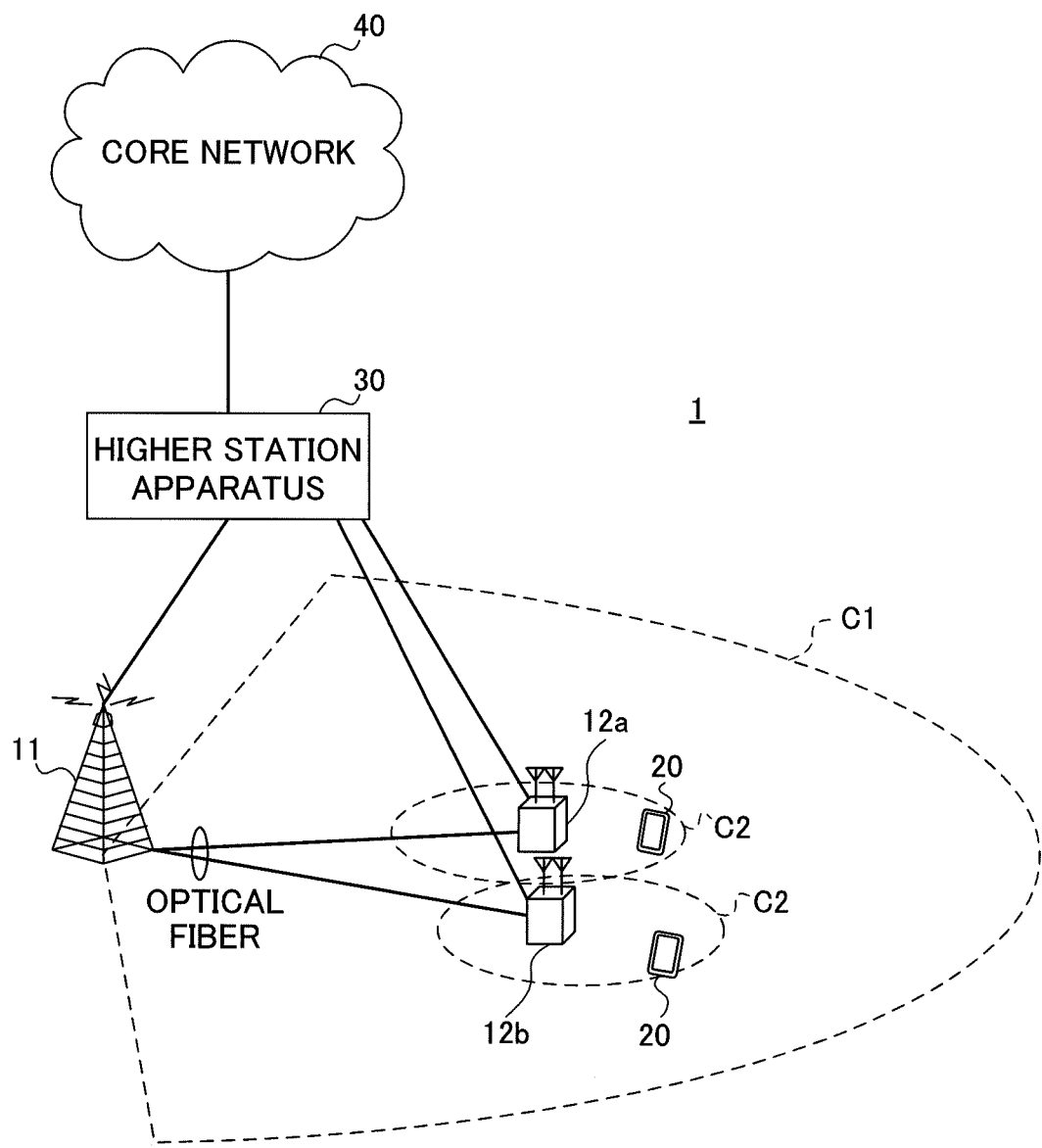
FIG. 9 is a schematic diagram to show an example of a radio communication system according to the present embodiment.

FIG. 9 is a schematic structure diagram of a radio communication system according to the present embodiment. Note that the radio communication system shown in FIG. 4 is a system to accommodate, for example, the LTE system or SUPER 3G. This radio communication system employs carrier aggregation, whereby a plurality of fundamental frequency blocks (component carriers) are grouped into one, using the system band of the LTE system as one unit. This radio communication system may be referred to as "IMT-advanced," "4G," "FRA (Future Radio Access)" and so on.

As shown in FIG. 9, the radio communication system 1 has a macro station 11 that forms a macro cell C1, and small base stations 12a and 12b that are placed in the macro cell C1 and that form small cells C2, which are narrower than the macro cell C1. User terminals 20 are placed in the macro cell C1 and in each small cell C2. The user terminals 20 and are configured to be able to perform radio communication with both of the macro station 11 and the small base stations 12.

Communication between the user terminals 20 and the macro base station 11 is carried out using a carrier of a relatively low frequency bandwidth (for example, 2 GHz) and a wide bandwidth (referred to as "conventional carrier," "legacy carrier," and so on). Between the user terminals 20 and the small base stations 12, a carrier of a relatively high frequency bandwidth (for example, 3.5 GHz and so on) and a narrow bandwidth is used. The macro base station 11 and each small base station 12 are connected by wire connection or by wireless connection.

The macro base station 11 and each small base station 12 are each connected with a higher station apparatus 30, and are connected to a core network 40 via the higher station apparatus 30. Note that the higher station apparatus may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB," a "radio base station apparatus," a "transmission point" and so on. The small base stations 12 are radio base stations having local coverages, and may be referred to as "pico base stations," "femto base stations," "Home eNodeBs," "micro base stations," "transmission points" and so on. The small base stations 12 may be radio base stations that form phantom cells. In phantom cells, a subframe (of a new carrier type, an additional carrier type and so on), in which the PDCCH is not arranged in maximum three OFDM symbols from the top, is used.

The macro base station 11 and the small base stations 12 will be referred to as "radio base stations 10," unless distinction needs to be drawn otherwise. Each user terminal 20 is a terminal that supports various communication schemes such as LTE, LTE-A and so on, and may be both a mobile communication terminal and a fixed communication terminal.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels that are used in the radio communication system shown in FIG. 9 will be described. Downlink communication channels include a PDSCH (Physical Downlink Shared Channel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Scheduling information for the PDSCH and the PUSCH and so on may be transmitted by the enhanced PDCCH (also referred to as, for example, an "enhanced physical downlink control channel," an "ePDCCH," an "E-PDCCH," an "FDM-type PDCCH" and so on). This enhanced PDCCH (enhanced downlink control channel) is frequency-division-multiplexed with the PDSCH (downlink shared data channel), and used to cover the shortage of the capacity of the PDCCH.

Uplink control channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. By means of the PUCCH, downlink radio quality information (CQI: Channel Quality Indicator), ACK/NACK and so on are transmitted.

Figure 10:
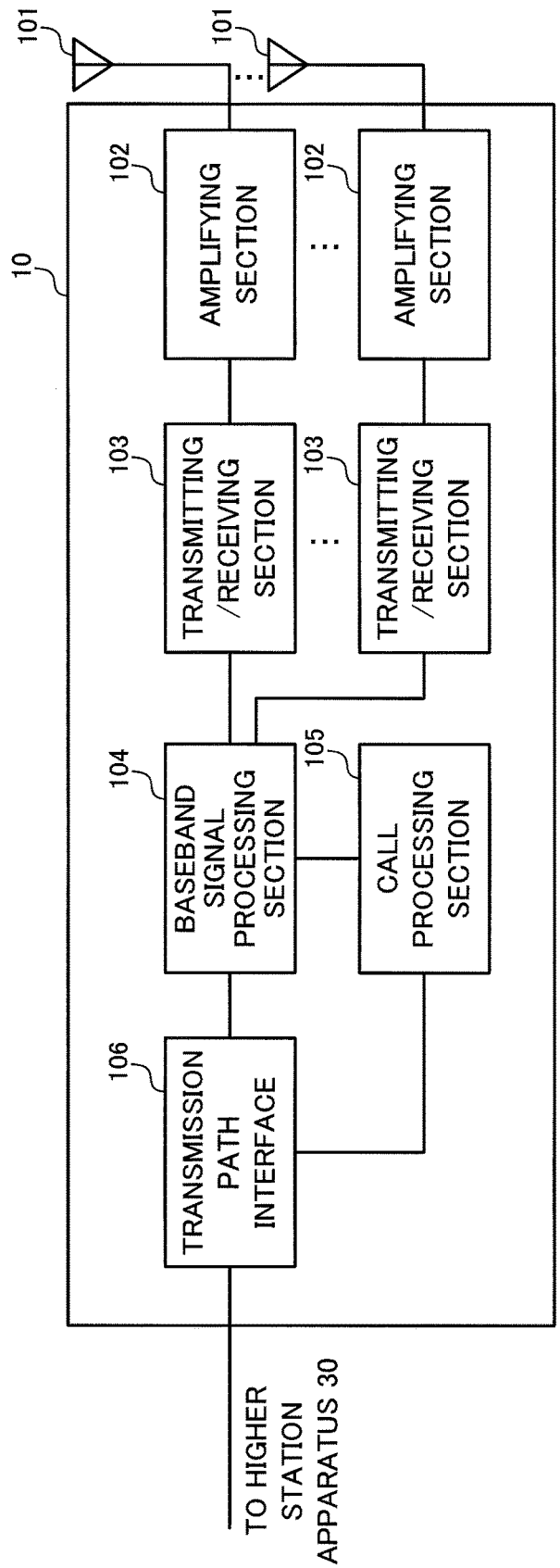
FIG. 10 is a diagram to explain an overall structure of a radio base station according to the present embodiment.

FIG. 10 is a diagram to show an overall structure of a radio base station 10 (which may be either the macro base station 11 or a small base station 12) according to the present embodiment. The radio base station 10 has a plurality of transmitting/receiving antennas 101 for MIMO transmission, amplifying sections 102, transmitting/receiving sections (transmitting section and receiving section) 103, a baseband signal processing section 104, a call processing section 105, and a transmission path interface 106.

User data to be transmitted from the radio base station 10 to the user terminal 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 203. Furthermore, downlink control signals are also subjected to transmission processes such as channel coding and an inverse fast Fourier transform, and are transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

With the present embodiment, if carrier aggregation is carried out by aggregating the first component carrier used in the macro cell C1 and the second component carrier used in the small cells C2, the transmitting/receiving sections 103 of the macro base station 11 convert the downlink signals output from the baseband signal processing section 104 into the radio frequency band of the first component carrier and transmit these signals to the user terminal 20. Similarly, the transmitting/receiving sections 103 of the small base stations 12 convert the downlink signals output from the baseband signal processing section 104 into the radio frequency band of the second component carrier and transmit these signals to the user terminal 20. The RF transmitting circuits of the macro base station 11 and the small base stations 12 are constituted with each transmitting/receiving section 103.

As for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

With the present embodiment, when carrier aggregation is carried out by aggregating the first component carrier used in the macro cell C1 and the second component carrier used in the small cells C2, the transmitting/receiving sections 103 of the macro base station 11 output the uplink signals received from the user terminal 20, to the baseband signal processing section 104, by using the first component carrier. The transmitting/receiving sections 103 of the small base stations 12 output the uplink signals received from the user terminal 20, to the baseband signal processing section 104, by using the second component carrier. The RF receiving circuits of the macro base station 11 and the small base stations 12 are constituted with each transmitting/receiving section 103.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base stations 10 and manages the radio resources.

Figure 11:
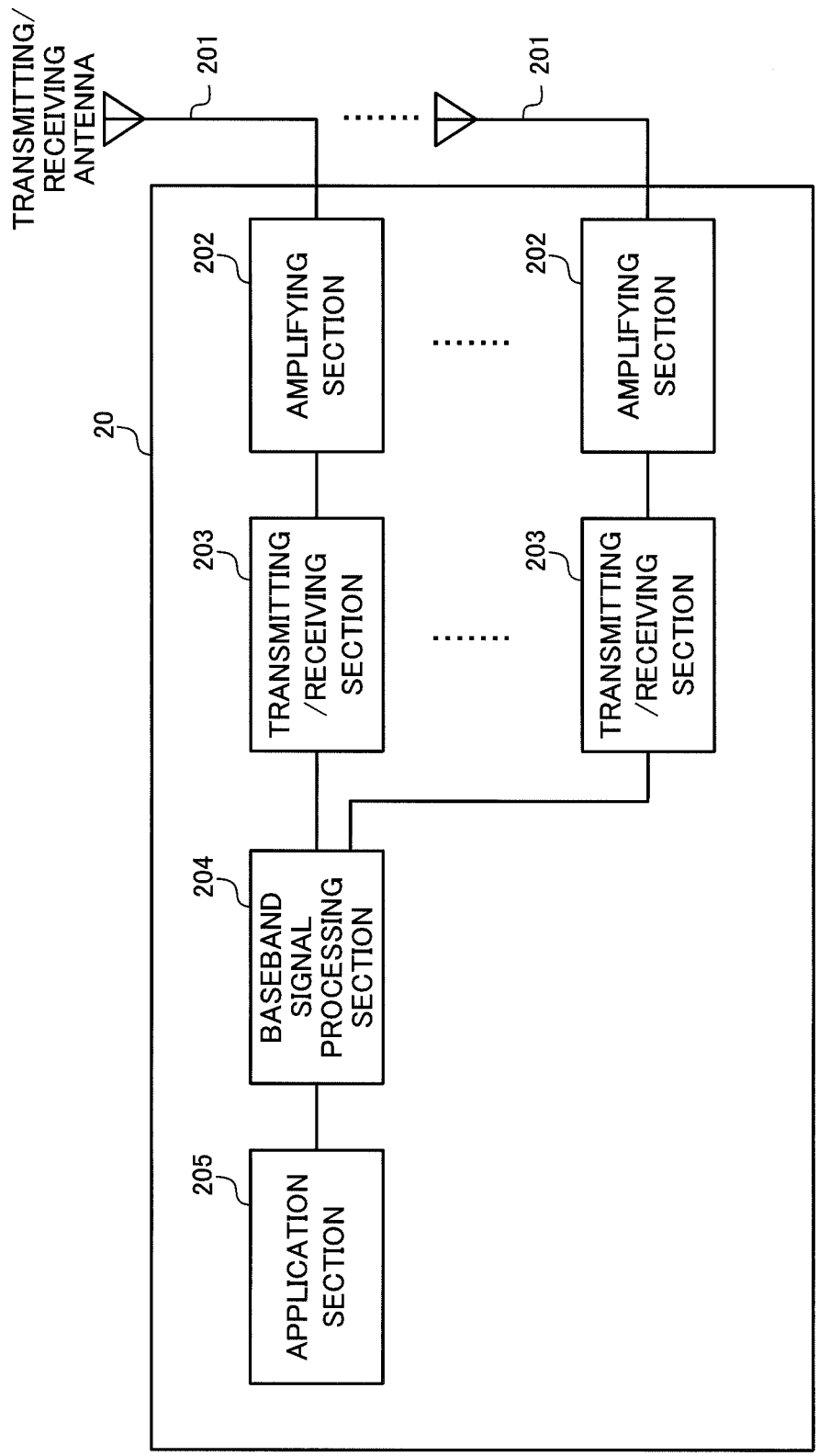
FIG. 11 is a diagram to explain an overall structure of a user terminal according to the present embodiment.

FIG. 11 is a diagram to show an overall structure of the user terminal 20 according to the present embodiment. The user terminal 20 has a plurality of transmitting/receiving antennas 201 for MIMO transmission, amplifying sections 202, transmitting/receiving sections (receiving section and transmitting section) 203, a baseband signal processing section 204 and an application section 205.

As for downlink signals, radio frequency signals that are received in the plurality of transmitting/receiving antennas 201 are each amplified in the amplifying sections 202, and subjected to frequency conversion in the transmitting/receiving sections 203 and input in the baseband signal processing section 204. In the baseband signal processing section 204, an FFT process, error correction decoding, a retransmission control receiving process and so on are performed. The user data included in the downlink signals is transferred to the application section 205. The application section 205 performs processes related to higher layers above the physical layer and the MAC layer. In the downlink data, broadcast information is also transferred to the application section 205.

With the present embodiment, when carrier aggregation is carried out by aggregating the first component carrier used in the macro cell C1 and the second component carrier used in the small cells C2, each transmitting/receiving sections 203 switches the component carrier in accordance with the durations that are configured based on duration configuration information (described later). Each transmitting/receiving section 203 outputs downlink signals received in the radio frequency band of the switched component carrier to the baseband signal processing section 204. The RF receiving circuit of the user terminal 20 is constituted with each transmitting/receiving section 203.

Uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

With the present embodiment, when carrier aggregation is carried out by aggregating the first component carrier used in the macro cell C1 and the second component carrier used in the small cells C2, each transmitting/receiving sections 203 convert uplink signals output from the baseband signal processing section 204 into the radio frequency band of the component carrier that is switched in accordance with the duration. The RF transmitting circuit of the user terminal 20 is constituted with each transmitting/receiving section 203.

Figure 12:
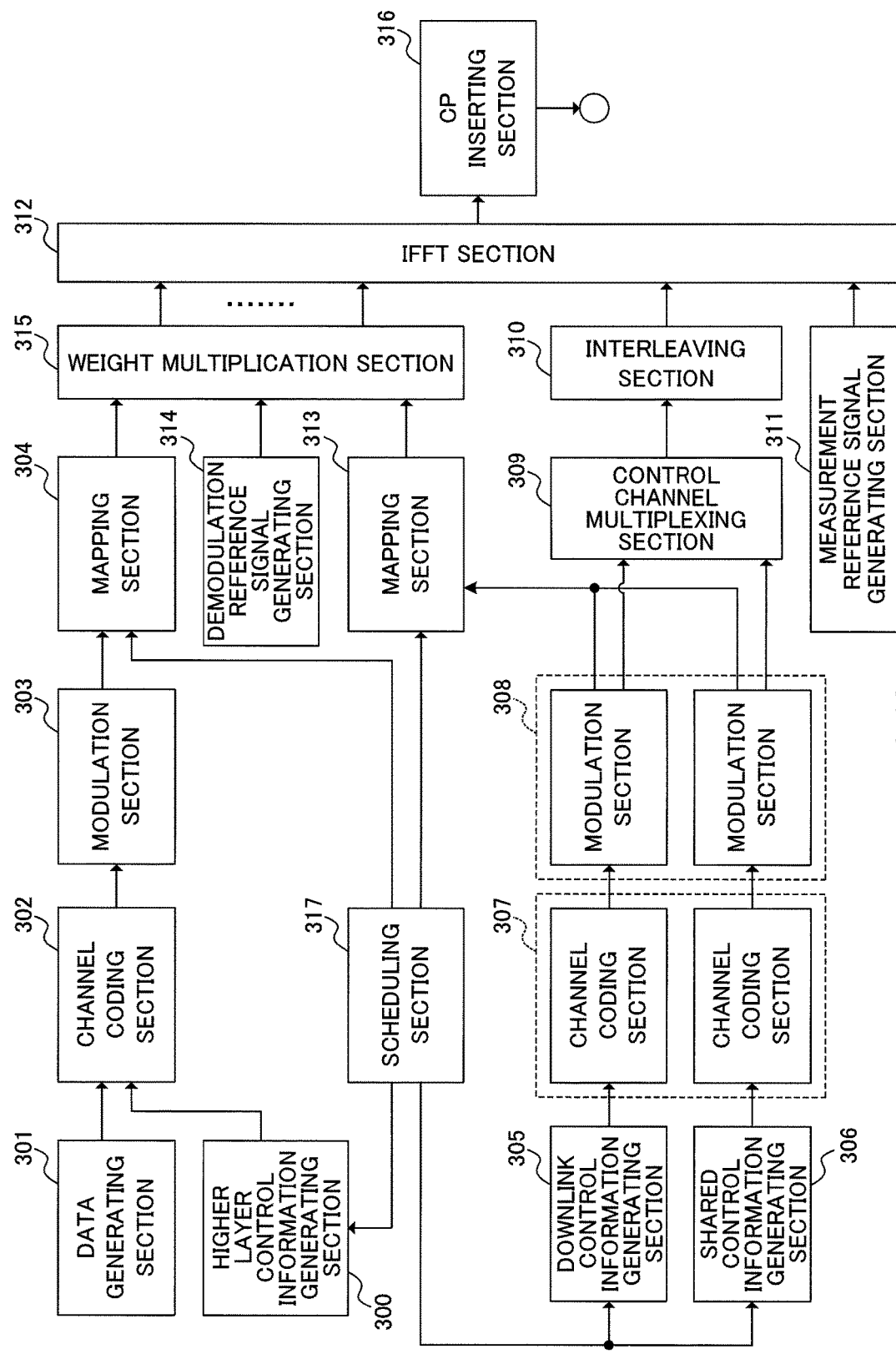
FIG. 12 is a function structure diagram of a baseband processing section in a radio base station according to the present embodiment.

FIG. 12 is a function structure diagram of the baseband signal processing section 104 provided in the radio base stations 10 according to the present embodiment. Note that, although FIG. 12 primarily shows downlink (transmitting) functional configurations, the radio base station 10 may have uplink (receiving) functional configurations as well.

As shown in FIG. 12, a radio base station 10 has a higher layer control information generating section 300, a data generating section 301, a channel coding section 302, a modulation section 303, a mapping section 304, a downlink control information generating section 305, a shared control information generating section 306, a channel coding section 307, a modulation section 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316 and a scheduling section 317. Note that, when the radio base station 10 is a small base station 12 that forms a small cell C2, the control channel multiplexing section 309 and the interleaving section 310 may be omitted.

The higher layer control information generating section 300 generates higher layer control information on a per user terminal 20 basis. The higher layer control information is control information that is sent through higher layer signaling (for example, RRC signaling).

With the present embodiment, the higher layer control information generating section 300 generates duration configuration information (the first example). When carrier aggregation is carried out by aggregating the first component carrier used in the macro cell C1 and the second component carrier used in the small cells C2, the duration configuration information indicates the first duration (in FIG. 3, duration #A) to communicate with the macro base station 11 by using the first component carrier, and the second duration (in FIG. 3, duration #B) to communicate with the small base stations 12 by using the second component carrier. The duration configuration information may be reported to the user terminal 20 using RRC signaling, when the above carrier aggregation is configured. Note that the duration configuration information is shared between the macro base station 11 and the small base stations 12.

With the present embodiment, the higher layer control information generating section 300 may generate duration change information (the second example). The duration change information refers to information for changing the lengths of the above first duration and second duration. The duration change information may be reported to the user terminal 20 by using MAC signaling. Note that the duration change information may be reported directly from the macro base station 11 to the small base stations 12 via a backhaul link, or may be reported to the small base stations 12 via the user terminal 20 by using MAC signaling.

With the present embodiment, the higher layer control information generating section 300 may generate shift information (the fourth example). When the time division duplexing (TDD) scheme is employed in both of the first component carrier and the second component carrier, the shift information refers to information for shifting the uplink subframes of the first component carrier and/or the second component carrier. The shift information may be reported to the user terminal 20 by using RRC signaling.

With the present embodiment, the higher layer control information generating section 300 may generate component carrier information (the fifth example). When a common duration that is shared between a plurality of component carriers is configured (see FIG. 7B), the component carrier information serves as information to indicate which component carriers should be used. The component carrier information may be reported to the user terminal 20 by using MAC signaling.

The data generating section 301 generates downlink user data on a per user terminal 20 basis. The downlink user data generated in the data generating section 301 and the higher layer control information generated in the higher layer control information generating section 300 are input in the channel coding section 302 as downlink data to be transmitted in the PDSCH. The channel coding section 302 performs channel coding of the downlink data for each user terminal 20 in accordance with coding rates determined based on feedback information from each user terminal 20. The modulation section 303 modulates the downlink data having been subjected to channel coding, in accordance with modulation schemes determined based on feedback information from each user terminal 20. The mapping section 304 maps the modulated downlink data in accordance with commands from the scheduling section 317.

The downlink control information generating section 305 generates UE-specific downlink control information on a per user terminal 20 basis. The UE-specific downlink control information includes PDSCH scheduling information (DL grants, DCI formats 1A and 1C, and so on), PUSCH scheduling information (UL grants, DCI formats 0 and 4, and so on) and/or the like. The shared control information generating section 306 generates shared control information that is cell-specific. The cell-specific control information includes, for example, control information for DCI formats 1A and 1.

The downlink control information generated in the downlink control information generating section 305 and the shared control information generated in the shared control information generating section 306 are input in the channel coding section 307 as downlink control information to be transmitted in the PDCCH or the enhanced PDCCH. The channel coding sections 307 performs channel coding of the downlink control information received as input, in accordance with coding rates designated by the scheduling section 317, which will be described later. The modulation sections 308 modulate the downlink control information after channel coding in accordance with modulation schemes designated by the scheduling section 317.

Here, the downlink control information to be transmitted in the PDCCH is input from the modulation sections 308 into the control channel multiplexing section 309 and multiplexed. The downlink control information that is multiplexed in the control channel multiplexing section 309 is interleaved in the interleaving section 310. The interleaved downlink control information is input in the IFFT section 312, with measurement reference signals (CSI-RSs: Channel State Information-Reference Signals, CRSs: Cell-specific Reference Signals, and so on) generated in the measurement reference signal section 311.

Downlink control information to be transmitted in the enhanced PDCCH is input from the modulation sections 308 into the mapping section 313. The mapping section 313 maps the downlink control information in predetermined allocation units (for example, in eCCEs or in eREGs) in accordance with commands from the scheduling section 317, which will be described later.

The mapped downlink control information is input in the weight multiplication section 315, with the downlink data to be transmitted in the PDSCH (that is, the downlink data mapped in the mapping section 314) and demodulation reference signals (DM-RSs) generated in the demodulation reference signal generating section 314. The weight multiplication section 315 multiplies the downlink data to be transmitted by the PDCSH, the downlink control information to be transmitted by the enhanced PDCCH and the demodulation reference signals, by user terminal 20-specific precoding weights, and pre-codes them. The pre-coded transmission data is input in the IFFT section 312, and converted from frequency domain signals into time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 schedules the downlink data to be transmitted in the PDSCH, the downlink control information to be transmitted in the enhanced PDCCH, and the downlink control information to be transmitted in the PDCCH. To be more specific, the scheduling section 317 allocates radio resources based on command information from the higher station apparatus 30 and feedback information from each user terminal 20 (for example, channel state information (CSI), which includes channel quality indicators (CQIs) and rank indicators (RIs) and so on).

With the present embodiment, when carrier aggregation is carried out by aggregating the first component carrier used in the macro cell C1 and the second component carrier used in the small cells C2, the scheduling section 317 switches the component carrier to use in each transmitting/receiving section 103 in accordance with the durations configured based on the above duration configuration information.

Figure 13:
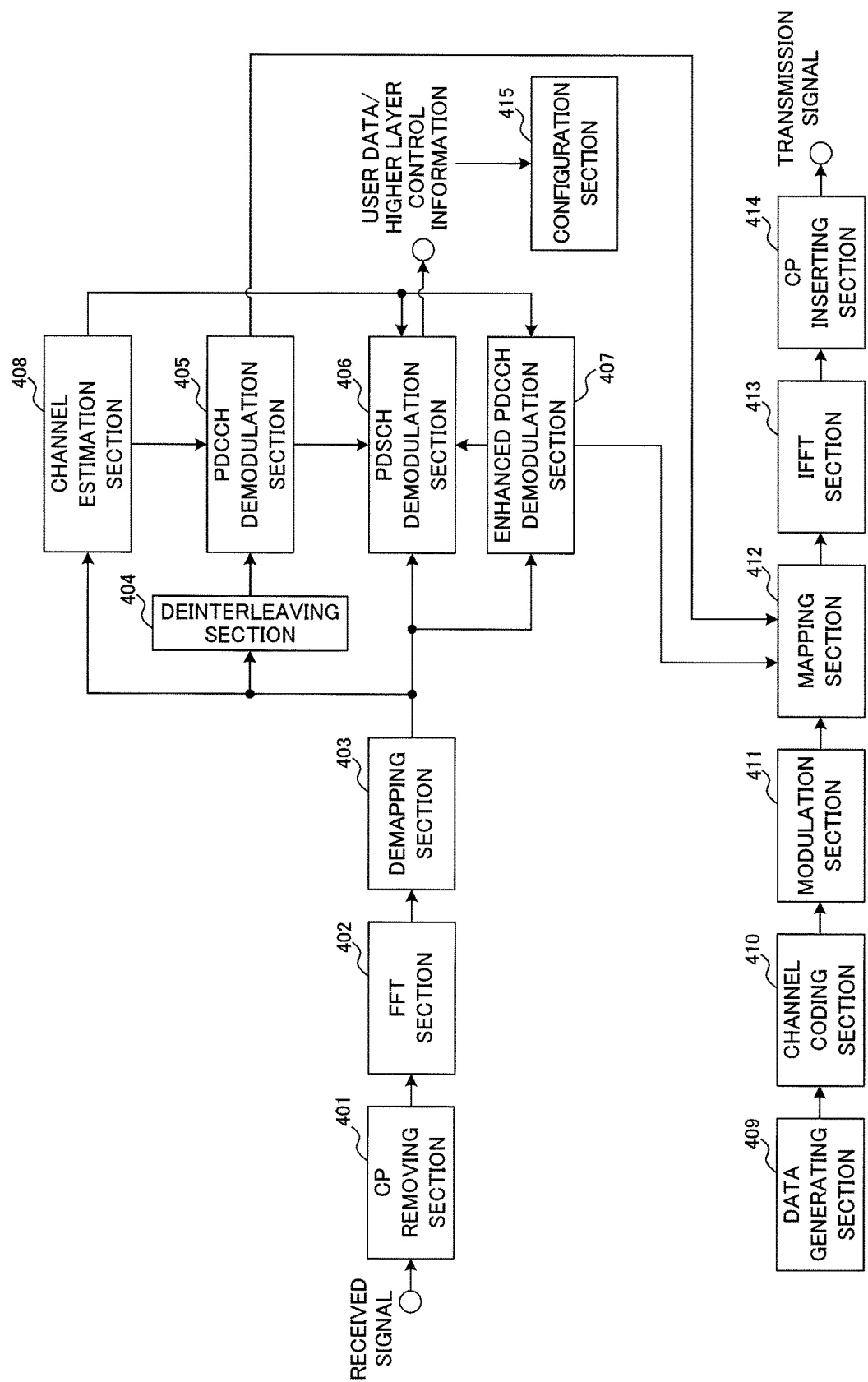
FIG. 13 is a function structure diagram of a baseband processing section in a user terminal according to the present embodiment.

FIG. 13 is a function structure diagram of the baseband signal processing section 204 provided in the user terminal 20. The user terminal 20 has, as downlink (receiving) functional configurations, a CP removing section 401, an FFT section 402, a demapping section 403, a deinterleaving section 404, a PDCCH demodulation section 405, a PDSCH demodulation section 406, an enhanced PDCCH demodulation section 407 and a channel estimation section 408.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) of the downlink signals, converts the time domain signals into frequency domain signals, and inputs these signals in the demapping section 403. The demapping section 403 demaps the downlink signals. Note that the demapping process in the demapping section 403 is carried out based on higher layer control information input from the application section 205. Downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the result of channel estimation in the channel estimation section 408, which will be described later.

The PDCCH demodulation section 406 performs demodulation, channel decoding and so on of the downlink data output from the demapping section 403, based on the result of channel estimation in the channel estimation section 408, which will be described later. To be more specific, the PDSCH demodulation section 406 demodulates the PDSCH allocated to the subject user terminal based on the downlink control information (for example, downlink scheduling information such as DL grants) demodulated in the PDCCH demodulation section 405 or the enhanced PDCCH demodulation section 407, and acquires the downlink data (downlink user data and higher layer control information) for the subject user terminal.

With the present embodiment, the PDSCH demodulation section 406 acquires duration configuration information as higher layer (for example, RRC) control information, and outputs this information to the configuration section 415 (the first example). The PDSCH demodulation section 406 may acquire duration change information as higher layer (for example, MAC) control information, and outputs this information to the configuration section 415 (the second example). The PDSCH demodulation section 406 may acquire shift information as higher layer (for example, MAC) control information, and outputs this information to the configuration section 415 (the fourth example). The PDSCH demodulation section 406 may acquire component carrier information as higher layer (for example, MAC) control information, and outputs this information to the configuration section (the fifth example).

The enhanced PDCCH demodulation section 407 performs blind decoding, demodulation, and channel decoding of the enhanced PDCCH demodulation section 407 output from the demapping section 403 based on the result of channel estimation in the channel estimation section 408, which will be described later. The channel estimation section 408 performs channel estimation using the demodulation reference signals (DM-RSs), measurement reference signals (CRSs, CSI-RSs and so on) and/or the like.

The user terminal 20 has, as uplink (transmitting) functional configurations, a data generating section 409, a channel coding section 410, a modulation section 411, a mapping section 412, an IFFT section 413 and a CP inserting section 414.

The data generating section 409 generates uplink data (including user data and higher layer control information). The generated uplink data is input in the channel coding section 410 as uplink data to be transmitted in the PUSCH. The channel coding section 410 performs channel coding of the uplink data that is input, in accordance with predetermined coding rates. The modulation section 411 modulates the uplink data having been subjected to channel coding, in accordance with predetermined modulation schemes.

The mapping section 412 maps the modulated uplink data based on uplink scheduling information demodulated in the PDCCH demodulation section 405 or the enhanced PDCCH demodulation section 407. The IFFT section 413 converts input data matching the system band into time sequence data by performing an inverse fast Fourier transform, and the CP inserting section 414 inserts cyclic prefixes in the time sequence data per data division.

With the present embodiment, when carrier aggregation is carried out by aggregating the first component carrier used in the macro cell C1 and the second component carrier used in the small cells C2, the configuration section 415 configures the first duration (in FIG. 3, duration #A) to communicate with the macro base station 11 by using the first component carrier, and the second duration (in FIG. 3, duration #B) to communicate with the small base stations 12 by using the second component carrier based on the above duration configuration information (the first example).

With the present embodiment, the configuration section 415 may change the length of the above first duration and second duration base on the above duration change information (the second example). For example, referring to FIG. 4, duration #A to communicate with the macro base station by using the first component carrier 11 and duration #B (duration #A<duration #B) to communicate with the small base stations by using the second component carrier 12 are changed to duration #C and duration #D (duration #C>duration #D), respectively.

With the present embodiment, when one of the first component carrier and the second component carrier employs the time division duplexing (TDD) scheme and the other one employs the frequency division duplexing (FDD) scheme, the configuration section 415 may switch the component carriers used in the transmitting/receiving sections 203, such that, in downlink subframes (in FIG. 5, subframes #0, #4, #5 and #9) of the component carrier employing the TDD scheme, uplink signals are transmitted by using the component carrier employing the FDD scheme (the third example).

With the present embodiment, when the time division duplexing (TDD) scheme is employed in both of the first component carrier and the second component carrier, the configuration section 415 may shift the uplink subframes of the first component carrier and/or the second component carrier based on shift information (the fourth example). For example, in FIG. 6, the uplink subframes of the second component carrier (CC 2) are shifted two subframes forward.

According to the present embodiment, when carrier aggregation is carried out by aggregating three or more component carriers including the first component carrier and the second component carrier, the configuration section 415 may configure separate durations on a per component carrier basis (in FIG. 7A, durations #A to #C) (the fifth example).

With the present embodiment, when carrier aggregation is carried out by aggregating three or more component carriers including the above first component carrier and the second component carrier, the configuration section 415 may configure a common duration that is shared between a plurality of component carriers (in FIG. 7B, duration #B) (the fifth example).

As has been described above, with the radio communication system 1 according to the present embodiment, when carrier aggregation is carried out by aggregating the first component carrier used in the macro cell C1 and the second component carrier used in the small cells C2, it is possible to configure, in advance, the first duration to use the first component carrier and the second duration to use the second component carrier, so that it is possible to implement 1-CC transmission in a simple fashion.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-224475, filed on Oct. 9, 2012, including the specification, drawings and abstract, is incorporated herein by reference in its entirety.

The invention claimed is:

1. A user terminal in a radio communication system where carrier aggregation is carried out by aggregating a first component carrier, which is used in a macro cell, and a second component carrier, which is used in a small cell, the user terminal comprising:
   a receiver that receives duration configuration information, which indicates a first duration to communicate with a macro base station forming the macro cell by using the first component carrier, and a second duration to communicate with a small base station forming the small cell by using the second component carrier;
   a processor that configures the first duration and the second duration based on the duration configuration information; and
   a transmitter that, in the first duration, transmits an uplink signal for the macro base station by using the first component carrier, and that, in the second duration, transmits an uplink signal for the small base station by using the second component carrier,
   wherein at least in uplink transmission, the transmitter transmits the uplink signal by using either of the first component carrier and the second component carrier switchingly based on the first duration and the second duration configured.

2. The user terminal according to claim 1, wherein the receiver receives, in the first duration, a downlink signal from the macro base station by using the first component carrier, and receives, in the second duration, a downlink signal from the small base station by using the second component carrier.

3. The user terminal according to claim 1, wherein:
the receiver receives duration change information for changing lengths of the first duration and the second duration; and
the processor changes the lengths of the first duration and the second duration based on the duration change information.

4. The user terminal according to claim 1, wherein, when one of the first component carrier and the second component carrier employs a time division duplexing (TDD) scheme and the other of the first component carrier and the second component carrier employs a frequency division duplexing (FDD) scheme, the transmitter transmits uplink signals by using the component carrier where the FDD scheme is employed, in a downlink subframe of the component carrier where the TDD scheme is employed.

5. The user terminal according to claim 1, wherein, when the first component carrier and the second component carrier both employ a time division duplexing (TDD) scheme:
the receiver receives shift information for shifting uplink subframes of the first component carrier and/or the second component carrier; and
the transmitter transmits uplink signals in the uplink subframe that are configured based on the shift information.

6. The user terminal according to claim 1, wherein, when carrier aggregation is carried out by aggregating three or more component carriers including the first component carrier and the second component carrier, the processor configures separate durations on a per component carrier basis.

7. The user terminal according to claim 1, wherein, when carrier aggregation is carried out by aggregating three or more component carriers including the first component carrier and the second component carrier, the processor configures a common duration that is shared between a plurality of component carriers.

8. The user terminal according to claim 1, wherein the transmitter switches a carrier to transmit the uplink signal, between the first component carrier and the second component carrier, in a given switching time.

9. A radio base station that forms a macro cell in a radio communication system where carrier aggregation is carried out by aggregating a first component carrier, which is used in the macro cell, and a second component carrier, which is used in a small cell, the radio base station comprising:
a transmitter that transmits duration configuration information to a user terminal, the duration configuration information indicating a first duration to communicate with the radio base station by using the first component carrier, and a second duration to communicate with the small base station forming the small cell by using the second component carrier; and
a receiver that receives from the user terminal by using the first component carrier in the first duration,
wherein at least in uplink transmission, the user terminal transmits uplink signal by using either of the first component carrier and the second component carrier switchingly based on the first duration and the second duration configured.

10. A radio communication system where carrier aggregation is carried out by aggregating a first component carrier, which is used in a macro cell, and a second component carrier, which is used in a small cell, comprising:
a macro base station forming the macro cell that comprises a transmitter that transmits duration configuration information to a user terminal, the duration configuration information indicating a first duration to communicate with the macro base station by using the first component carrier, and a second duration to communicate with a small base station forming the small cell by using the second component carrier; and
the user terminal comprises:
a processor that configures the first duration and the second duration based on the duration configuration information; and
a transmitter that, in the first duration, transmits an uplink signal for the macro base station by using the first component carrier, and that, in the second duration, transmits an uplink signal for the small base station by using the second component carrier,
wherein at least in uplink transmission, the transmitter transmits the uplink signal by using either of the first component carrier and the second component carrier switchingly based on the first duration and the second duration configured.

11. A radio communication method comprising:
performing carrier aggregation by aggregating a first component carrier, which is used in a macro cell, and a second component carrier, which is used in a small cell;
transmitting, by a macro base station forming the macro cell, duration configuration information to a user terminal, the duration configuration information indicating a first duration to communicate with the macro base station by using the first component carrier, and a second duration to communicate with a small base station forming the small cell by using the second component carrier; and
at the user terminal:
configuring the first duration and the second duration based on the duration configuration information; and
in the first duration, transmitting an uplink signal for the macro base station by using the first component carrier, and, in the second duration, transmitting an uplink signal for the small base station by using the second component carrier,
wherein at least in uplink transmission, the user terminal transmits the uplink signal by using either of the first component carrier and the second component carrier switchingly based on the first duration and the second duration configured.

* * * * *